March 18, 1952 E. E. LEWIS ET AL 2,590,023
SYSTEM FOR PARALLELING ELECTRIC ALTERNATORS
Filed May 5, 1950 3 Sheets-Sheet 1
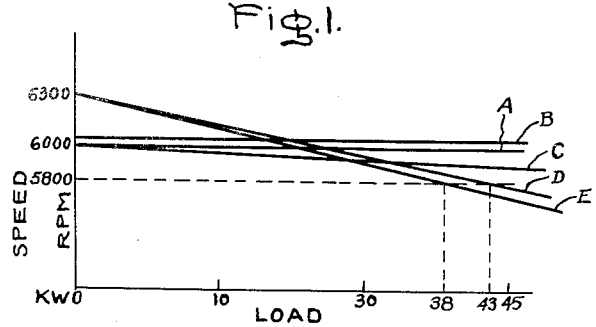
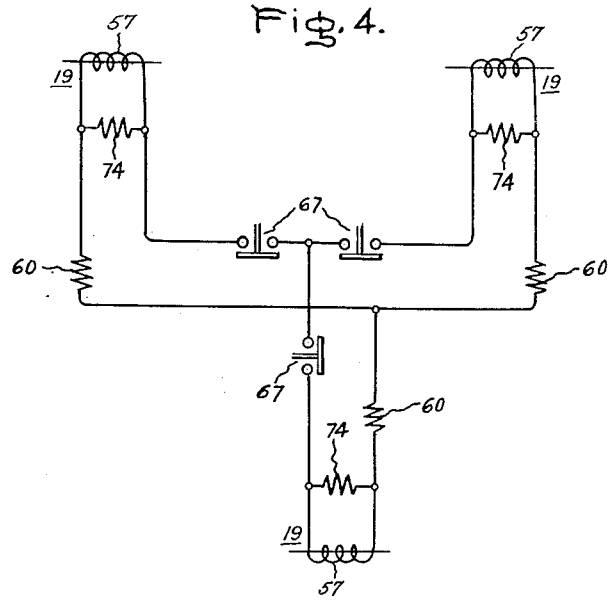
Inventors:
Ernest E. Lewis,
Raymond E. Thorn,
by Claude H. Mots
Their Attorney.

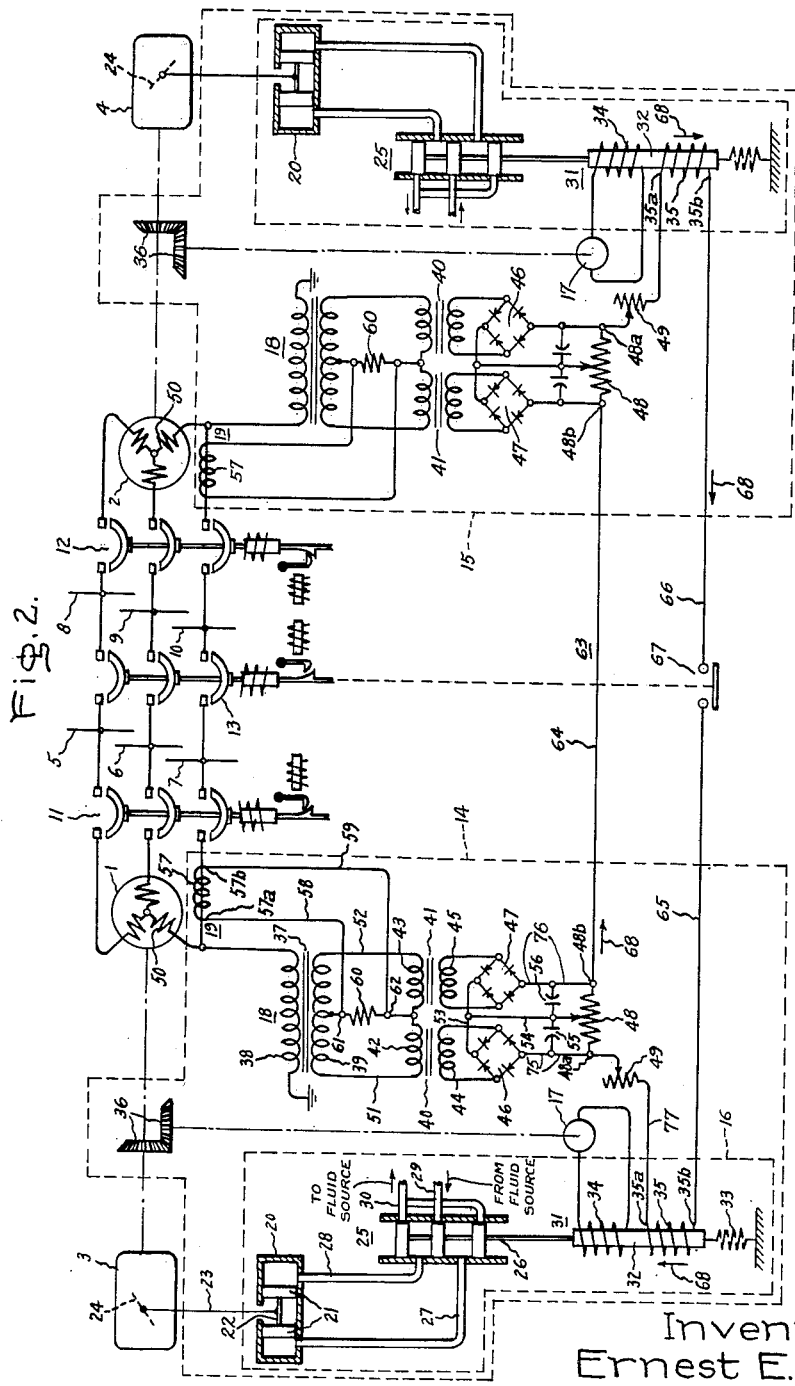

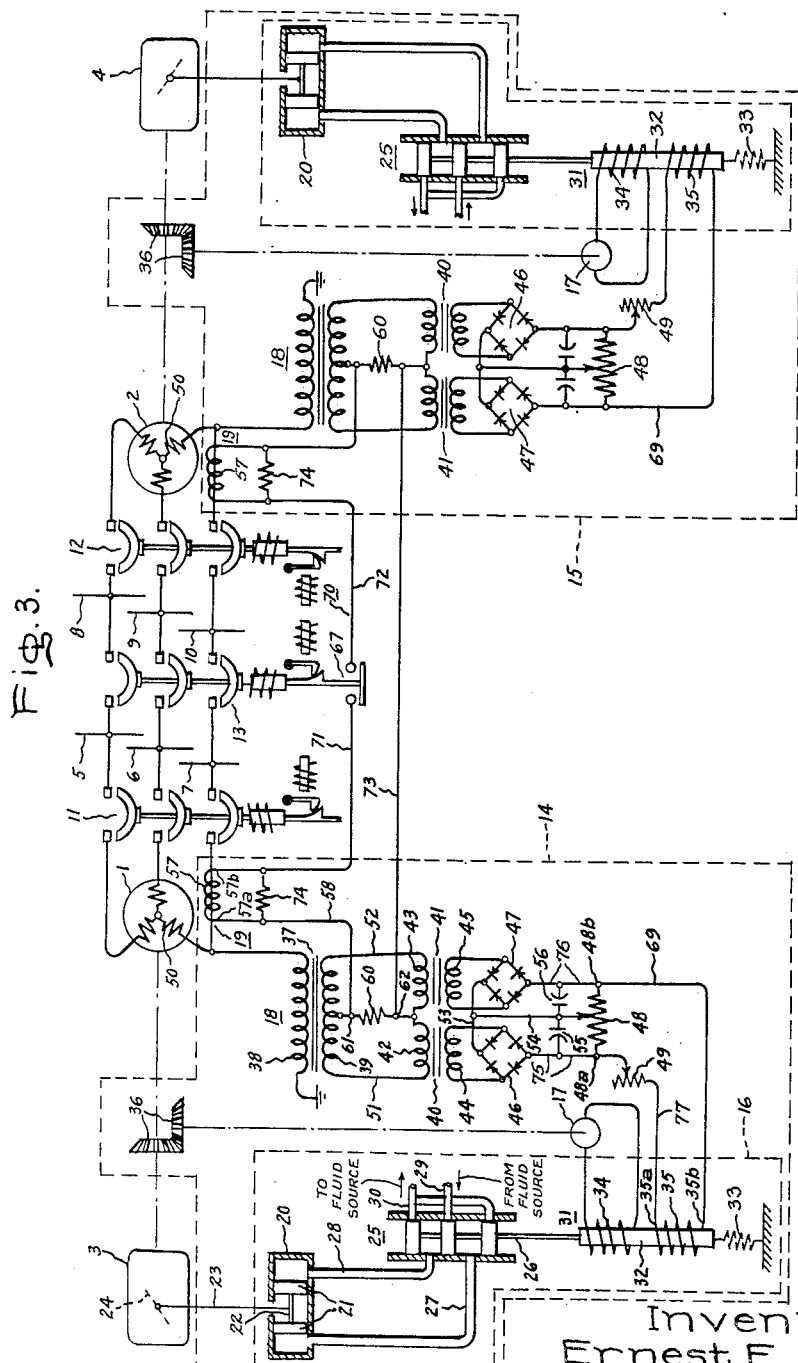

Patented Mar. 18, 1952

2,590,023

UNITED STATES PATENT OFFICE 2,590,023

SYSTEM FOR PARALLELING ELECTRIC ALTERNATORS

Ernest E. Lewis, Scotia, and Raymond E. Thorn, Schenectady, N. Y., assignors to General Electric Company, a corporation of New York Application May 5, 1950, Serial No. 160,262

9 Claims. (Cl. 290—4)

This invention relates to systems for parallel operation of electric alternators and has for its object the provision of a simple reliable system for stable parallel operation of electric alternators having substantially load-speed non-drooping characteristics.

In carrying out our invention we may employ an electro-mechanical speed governing means for each alternator and its associated prime mover, a control means in each of the speed governing means electrically connected to the associated alternator and responsive to load current therein, circuit breakers for electrically connecting the alternators in parallel electric circuit, and connections for electrically interconnecting the speed governing means in a predetermined cooperative relation to maintain an equal division of load current in the alternators in response to cooperative operation of the speed governing means.

For a complete understanding of our invention, reference should be had to the following specification and the accompanying drawings in which Fig. 1 is a chart of speed load characteristics of alternators which may be connected in parallel and is used to described the operating characteristics produced by our system and to illustrate the advantages thereof; Fig. 2 is a circuit diagram illustrative of one embodiment of our invention, as applied to parallel operation of two alternators; Fig. 3 is a circuit diagram illustrative of a second embodiment of our invention also applied to parallel operation of two alternators; and Fig. 4 is a partial circuit used to explain the adaptability of our invention to applications involving more than two alternators.

Referring to Fig. 1 of the drawing there is shown therein five curves A–E, plotted in terms of speed in revolutions per minute and load in kilowatts and indicating five possible speed load characteristics for prime movers.

Under certain conditions, as will be described in detail later, it is desirable to provide two prime movers with non-drooping load-speed characteristics and to connect the prime movers respectively to two alternators electrically interconnected for parallel operation. However, although two prime movers may be designed to operate along a non-drooping curve, as for example curve A, one of the prime movers may, because of manufacturing limitations, operate along a slightly different curve, as for example curve B or curve C.

Since alternators connected in parallel must operate at the same speed, considering two prime movers operating along curves A and B or A and C respectively, it is seen that, because of the slope of the curves A—C, there is no opportunity for division of the load at any common speed to permit stable parallel operation of two alternators connected respectively to the prime movers A and B or A and C.

Therefore, in a conventional system, to permit stable operation of two alternators connected respectively to two prime movers, the prime movers may be provided with speed load drooping characteristics as indicated by curves D and E. In the case of two prime movers operating on curves D and E, it is evident that the alternators may divide load at any speed within the range of operation of the prime movers. For example, at a load of 81 kilowatts on the alternators, the prime movers operating on the curves D and E may drive their respective alternators at a common speed of 5800 R. P. M. and the alternators assume respective loads of 38 and 43 kilowatts thereby providing a stable parallel operating condition.

Although this conventional system operates satisfactorily insofar as stable operating conditions of parallel alternators are concerned, the difficulty is that by providing the prime movers with drooping characteristics to permit stable parallel operation of alternators respectively connected thereto, variation in frequency results as load on the machines is increased. For many applications, the degree of frequency change necessary to permit parallel operation of the alternators is not detrimental. For other applications, as for example in 400 cycle aircraft alternators, certain special equipment supplied from such alternators is best operated at substantially constant frequency. Engineers have, therefore, been faced with the undesirable necessity of installing separate alternators to take care of this special equipment.

It would be desirable, therefore, to provide a system by which alternators could be operated in parallel without the necessity of providing speed load droop characteristics in their associated prime movers. For example, it would be desirable if alternators could be operated in parallel along the constant speed curve A. However, those skilled in the art will understand that with conventional speed regulating equipment, an attempt to operate two alternators along curve A would result in unstable operation for the reasons previously described.

It is an object, therefore, of our invention to provide a system for paralleling alternators to avoid the necessity of installing separate generators for special equipment while at the same time providing stable parallel operating conditions.

To accomplish this result in one aspect of our invention we provide an electrical system as shown in Fig. 2 in which two alternators 1 and 2 are mechanically connected respectively to associated prime movers 3 and 4 to be motivated thereby. Alternators 1 and 2 are electrically connected respectively to bus bars 5—7 and 8—10 through respective circuit breakers 11 and 12 and electrically interconnected for parallel operation through the medium of a common circuit breaker 13. To regulate the speed of prime movers 3 and 4, prime mover 3 is provided with an electro-mechanical speed governing means 14 and prime mover 4 is provided with a separate electro-mechanical speed governing means 15.

The electro-mechanical speed governing means 14 and 15 are identical, each comprising an electro-responsive force transmitting means 16, an electric tachometer 17, a potential transformer rectifier circuit 18, and a current transformer control means 19.

The electro-responsive force transmitting means may include an electro-responsive member having an operating coil and a load division coil. For example, means 16 as shown in Fig. 2 comprises a servomotor 20 having a pair of slidably positioned pistons 21 mechanically connected by a tie rod 22 which in turn is connected by a link 23 to a fuel regulating valve 24 of the particular prime mover associated with that servomotor to control the speed of the prime mover and its associated alternator by controlling the fuel supply to the prime movers.

Operation of the servomotor 20 is controlled by a pilot valve 25 having a valve element 26 slidably arranged, as shown in Fig. 2, to control the supply of fluid under pressure from a fluid source indicated to the servomotor 20 through fluid conduits 27—30.

Operation of the pilot valve 25 is controlled by a solenoid 31 having an armature 32 mechanically connected to the valve element 26 of the pilot valve 25 and spring biased in a downward direction, as viewed in Fig. 2, by a tension spring 33 mechanically connected between the armature 32 and a fixed member indicated. Solenoid 31 is also provided with a speed control winding 34 and a load adjusting winding 35. The speed control winding 34 is electrically connected to the electric tachometer 17 to receive electric current therefrom and move the armature 32 of the solenoid 31 in an upward direction a distance depending upon the value of current supplied by the tachometer 17. The tachometer 17 is mechanically connected to its associated prime mover 3 or 4 through a pair of gears 36 to be rotated thereby to supply the speed control winding 34 of the solenoid 31 with a current dependent in value upon the speed of the associated prime mover. It will be obvious that, in a system for parallel operation of alternators such as that shown, the individual tachometer generators 17 must necessarily operate at the same speeds. It obviously follows then that one tachometer generator 17, driven by a single alternator, could energize all of the speed control windings 34 of the respective solenoids 31 after parallel operation had been established.

The load adjusting winding 35 of the solenoid 31 adds to or subtracts from the effect of the speed control winding 34 on the movement of the armature 32 in accordance with the direction and value of a direct current supplied thereto from the potential transformer rectifier circuit 18. The manner of electrically connecting the circuit 18 to the load adjusting winding 35 will be described in detail later.

The circuit 18, which may be variously referred to below as a load measuring circuit or a wattmeter circuit, comprises a potential transformer 37 having a primary winding 38 and a center tapped secondary winding 39, a pair of additional potential transformers 40 and 41 having respectively primary windings 42—43 and secondary windings 44—45, a pair of rectifier circuits 46—47, an output resistor 48 having opposite ends 48a and 48b and an adjustable resistor 49.

The primary winding 38 of the transformer 37 is electrically connected in series circuit between a particular winding 50 of its associated alternator 1 or 2 and ground to energize the transformer rectifier circuit 18. The windings 50 are chosen as phase associated windings of the alternators 1 and 2 for reasons which will become apparent when operation of the system is explained. The primary windings 42 and 43 of the transformers 40 and 41 are electrically interconnected in series circuit and electrically connected to the secondary winding 39 of the transformer 37 by a pair of conductors 51—52 to be energized from transformer 37. The secondary windings 44—45 of the transformers 40 and 41 are electrically connected through respective rectifying circuits 46 and 47 and through conductors 53—54 and 75—76 and a pair of capacitors 55—56, as shown in Fig. 2, to the output resistor 48 to produce therein a direct current determinative of the voltage drop across the output resistor 48 and the relative polarity of its opposite ends 48a and 48b.

To control the value and direction of direct current supplied to the output resistor 48, the current transformer 19 is electrically connected in series with the winding 50 of its associated alternator 1 or 2 and a secondary winding 57 thereof having opposite ends 57a and 57b is electrically connected through a pair of conductors 58 and 59 to a resistor 60 of the circuit 18. Resistor 60 is electrically connected between a tap 61 of the secondary winding 39 of the transformer 37 and a point 62 electrically equidistant between primary winding 42 and 43 of the transformers 40 and 41.

The above-described circuit may be properly referred to as a wattmeter circuit since it measures a terminal voltage of the connected alternator as well as the current supplied by the alternator from the voltage measurement terminal, combining these measurements to provide a direct current voltage output across the resistor 48 as a measure of the load supplied by the associated alternator.

As shown in Fig. 2, ends 48a of the output resistors 48 of the speed governing means 14 and 15 are connected each through an associated adjustable resistor 49 to end 35a of the associated load adjusting winding 35 through a conductor 77. To explain the operation of a system as above described with respect to control of the current in load adjustment windings 35, assume for the moment that the ends 48b of the output resistors 48 are electrically connected respectively through conductors (not shown) to the ends 35b of the load adjustment windings 35, and that conductor 64 is non-existent. In such an arrangement the direction and value of current in each of the load adjustment windings 35 is determined by the load current in winding 50 of its associated alternator 1 or 2 and there is no cooperation between the two speed governing means 14 and 15. In such a system speed droop characteristics of the alternators must be provided to assure stable parallel operation thereof.

To permit stable parallel operation of the alternators 1 and 2 under conditions of non-drooping speed-load characteristics, in accordance with our invention we provide means for connecting the output resistors 48, the load adjustment windings 35 and the adjustable resistors 49 in a loop circuit 63. That is, ends 48b of output resistors 48 are electrically interconnected by a conductor 64 and ends 35b of the load adjustment windings 35 are electrically interconnected by a pair of conductors 65—66 through an electric interlock 67 mechanically connected to operate with the circuit breaker 13.

By the arrangement just described cooperative action is provided between the speed governing means 14—15 and each acts upon its respective associated prime mover in accordance with an unbalance of currents in the windings 50 of the alternators 1 and 2. That is, if alternators 1 and 2 are equally dividing a load, the currents in windings 50 will be equal and the voltages at ends 48b and ends 48a of the output resistors 48 are equal. Thus, no current flows in the loop circuit 64 under balanced load conditions and no correction is made by the speed governing means 14—15.

However, if alternator 1 is assuming a greater portion of a common load as evidenced by a larger current in winding 50 of alternator 1 as compared to current in winding 50 of alternator 2, then, under this unbalanced condition a larger voltage is developed across the output resistor 48 of the speed governing circuit 14 than is developed across the output resistor 48 of the speed governing circuit 15 and a direct current proportional to the difference in currents in the windings 50 of the alternators 1 and 2 flows in the loop circuit 63 in a direction indicated by the arrows 68. Thus, only one common current flows in each of the load adjustment windings 35. However, since this common current flows in opposite directions in the two load adjustment windings 35 it has an equal and opposite effect on the respective speed regulating means 14—15. That is, current flows in an upward direction in winding 35 of speed regulating means 14 which thus aids its associated speed control winding 34 in reducing the torque of prime mover 3 by operating the valve 24 to restrict the flow of fuel to prime mover 3. At the same time the same current flows in the opposite or downward direction in winding 35 of the speed governing means 15, thereby causing winding 35 to decrease the effect of its associated speed control winding 34 and cause an equal increase in torque of prime mover 4.

In this manner, when an unbalance of load occurs on the two alternators the speed governing means cooperate through the medium of a single current flowing in the loop circuit 63 to increase the torque of one prime mover and decrease the torque in the other prime mover to rebalance the load on the alternators 1 and 2 and provide stable operating conditions even though the prime movers have non-drooping load-speed characteristics.

In a second embodiment of our invention, of which Fig. 3 is illustrative, the loop circuit 63 of Fig. 2 is omitted and the output resistors 48 are electrically connected separately, each to its associated load adjusting winding 35 through its associated adjustable resistor 49 and conductors 69 and 77.

To control the operation of the circuits 18 and thereby the supply of control current to the load adjusting windings 35 of the speed governing means 14—15, the resistors 60 and the secondary windings 57 of the current transformers 19 are electrically interconnected in a loop circuit 70 by conductors 71—73 and the interlock 67.

Under conditions of equal load division on the alternators 1 and 2, as evidenced by equal currents in the windings 50 thereof, no adjustment of speed of the prime movers 1—2 is required and, therefore, no current is required in the load adjustment windings 35. Therefore, to control the operation of the circuits 18 to supply current to the windings 35 only when required and in direction and value proper to balance loads on the alternators 1—2, the secondary windings 57 of the current transformers 19 are electrically connected in voltage opposition in the loop circuit 70. Thus, when the currents in windings 50 of the alternators 1—2 are equal, no current flows in the loop circuit 70 and no signal is transmitted to the windings 35 of the speed governing means 14—15. However, when an unbalanced load condition develops in the alternators 1 and 2 a current, depending in value upon the difference in loads and depending in direction at any particular instant upon which of the alternators is carrying the larger load, flows in opposite directions in the resistors 60 to produce currents of equal value but flowing in opposite directions in the load division coils 35. The same effect on the prime movers 3 and 4 as described in detail for Fig. 2 therefore results in operation with the arrangement shown in Fig. 3 by cooperative action of the two speed governing means 14—15 in response to a single current flowing in a loop circuit between the two speed governing means. Adjustment of fuel supply to the prime movers to balance torque on the two alternators 1 and 2 under conditions of non-drooping load-speed characteristics and stable parallel operating conditions are thereby accomplished in each embodiment of our invention.

A discharge resistor 74 is provided for each of the current transformers 19 in Fig. 3 to improve stability.

Assuming that the terminal voltages across the windings 38 of the potential transformers 18 are substantially equal in phase and magnitude, it will be apparent that, in the embodiment of Fig. 3, the outputs across the respective resistors 48 in the load measuring circuits will be substantially identical, although of opposite polarity. From this it follows that a single load measuring or wattmeter circuit could be employed in this embodiment to supply both of the load adjustment windings 35. The respective windings 35 would be connected in opposite senses, of course, so that one would buck while the other boosted.

In the event that more than two alternators are to be operated in parallel it is necessary merely to include the additional current transformers 19 and resistors 60 or the output resistors 48 and load adjustment windings 35 (depending upon which of the two embodiments of our invention is chosen) of the speed governing means of the additional alternators in a loop circuit and in voltage opposition. For example, there is shown in Fig. 4 in diagrammatical form an arrangement of three current transformers 19 and three resistors 60 connected in loop circuit for control of three alternators (not shown).

Although this invention has been described above in terms of equal division of the loads between the alternators, it will be apparent that by proper adjustment of the circuit, for instance by adjustment of the rheostats 49, any desired ratio of loads may be maintained.

While we have shown and described a particular embodiment of our invention, it will be obvious to those skilled in the art that various changes and modifications may be made without departing from the invention and its broader aspects and we, therefore, aim in the appended claims to cover all such changes and modifications as fall within the true spirit and scope of the invention.

What we claim as new and desire to secure by Letters Patent of the United States is:

1. A regulating system for a plurality of parallel connected alternators driven by separate prime movers comprising a speed regulator for each of said alternators, each of said speed regulators comprising a spring biased solenoid, a speed control winding on said solenoid, said regulating system including at least one tachometer generator driven by one of said alternators and connected to energize said speed control windings to maintain each of said solenoids in a pre-determined position corresponding to a desired operating speed, a load power measuring device for each of said alternators, cross connections between said load measuring devices for determining deviations from a pre-determined desired generator load ratio, load adjusting windings on each of said solenoids and connections from said load measuring devices to said load adjusting windings for adjusting the individual speed regulators to maintain said pre-determined desired generator load ratio.

2. A regulating system for a plurality of parallel connected alternators driven by separate prime movers comprising a speed regulator for each of said alternators arranged for the control of speed by control of the flow of motive fluid to the associated prime mover, each of said speed regulators comprising a spring biased solenoid, a speed control winding on said solenoid, said regulating system including at least one tachometer generator driven by one of said alternators and connected to energize said speed control windings to maintain each of said solenoids in a pre-determined position corresponding to a desired operating speed, a load power measuring device for each of said alternators, cross connections between said load measuring devices for establishing electrical output signals indicative of the degree of deviation from a pre-determined desired generator load ratio, load adjusting windings on each of said solenoids and connections from said load measuring devices to said load adjusting windings for adjusting the individual speed regulators to maintain said pre-determined desired generator load ratio.

3. A regulating system for a plurality of parallel connected alternators respectively driven by separate prime movers comprising a valve for regulating the flow of motive fluid to each prime mover, a hydraulic positioning system connected for positioning said valve, a spring biased solenoid connected to control the position of said hydraulic positioning system, a speed control winding on said solenoid, a tachometer generator connected to energize said speed control winding, said tachometer generator being connected to be driven by the associated prime mover, electrical load measuring circuits connected to measure at least one current from each alternator, interconnections between the load measuring circuits of each alternator and of every other alternator for determining deviations from a pre-determined desired ratio of total load supplied by each alternator, a load adjustment winding on each of said solenoids and connections from said load measuring circuits to said load adjusting windings for simultaneous energization thereof to modify the position of each solenoid in order to adjust the flow of motive fluid to each prime mover and thereby maintain the desired ratio of alternator loads.

4. A regulating system for a plurality of parallel connected alternators respectively driven by separate prime movers comprising a valve for regulating the flow of motive fluid to each prime mover, a hydraulic positioning system connected for positioning said valve, a spring biased solenoid connected to control the position of said hydraulic positioning system, a speed control winding on said solenoid, a tachometer generator connected to energize said speed control winding, said tachometer generator being connected to be driven by the associated prime mover, electrical load measuring circuits connected to measure at least one voltage and one current from each alternator, interconnections between the load measuring circuits of each alternator and of every other alternator for determining deviations from a conditions of equal loading of each alternator, a load adjustment winding on each of said solenoids and connections from said load measuring circuits to said load adjustment windings for simultaneous energization thereof to modify the position of each solenoid in order to adjust the flow of motive fluid to each prime mover to maintain the desired equalization of alternator loads.

5. A regulating system for a plurality of parallel connected alternators respectively driven by separate prime movers for maintaining load frequency, system stability, and desired load distribution among the various alternators, said regulator comprising a speed signal generating tachometer driven by each prime mover, a speed control winding connected to be energized by said tachometer, a spring biased solenoid arranged for positioning by the energization of said speed control winding, a hydraulic servo control valve connected to said solenoid for positioning thereby, a hydraulic power piston hydraulically connected for positioning in accordance with the position of said servo control valve, a motive fluid control valve for said prime mover connected to said power piston for positioning thereby, a wattmeter circuit connected to each alternator for measuring the electrical load thereon in terms of at least one voltage and one current, a load adjustment winding on each of said solenoids, connections from each of said wattmeter circuits to the associated load adjustment winding for energization thereof, and connections between each of said wattmeter circuits and all of the other wattmeter circuits for comparing the respective loads and determining deviations from a desired load ratio to simultaneously energize said load adjustment windings with proper polarities to adjust the respective prime movers to maintain the desired alternator load ratio.

6. A regulating system for a plurality of parallel connected alternators respectively driven by separate prime movers comprising a valve for regulating the flow of motive fluid to each prime mover, a hydraulic positioning system connected for positioning said valve, a spring biased solenoid connected to control the position of said hydraulic positioning system, a speed control winding on said solenoid, a tachometer generator connected to energize said speed control winding, said tachometer generator being connected to be driven by the associated prime mover, electrical load measuring circuits connected to measure at least one voltage and one current from each alternator, a load adjustment winding on each of said solenoids, a series connection from each of said load measuring circuits to the associated load adjustment winding, parallel interconnections between the series connected load measuring circuit and load adjustment winding of each alternator and of every other alternator for determining deviations from a condition of equal loading of each alternator and for simultaneous energization of said load adjustment windings to modify the position of each solenoid in order to adjust the flow of motive fluid to each prime mover to maintain the desired equalization of alternator loads.

7. A regulating system for a plurality of parallel connected alternators respectively driven by separate prime movers for maintaining load frequency, system stability, and desired load distribution among the various alternators, said regulator comprising a speed signal generating tachometer driven by each prime mover, a speed control winding connected to be energized by said tachometer, a spring biased solenoid arranged for positioning by energization of said speed control winding, a hydraulic servo control valve connected to said solenoid for positioning thereby, a hydraulic power piston hydraulically connected for positioning in accordance with the position of said servo control valve, a motive fluid control valve for said prime mover connected to said power piston for positioning thereby, a wattmeter circuit connected to each alternator for measuring the electrical load thereon in terms of at least one voltage and one current, a load adjustment winding on each of said solenoids, the output of each of said wattmeter circuits being connected in series with the associated load adjustment winding and each of said wattmeter circuit-load adjustment winding series circuit combinations being connected in parallel with each of the others for comparing the respective loads and determining deviations from a desired load ratio to simultaneously energize said load adjustment windings with proper polarities to adjust the respective prime movers to maintain the desired alternator load ratio.

8. A regulating system for a plurality of parallel connected alternators driven by separate prime movers comprising a speed regulator for each of said alternators arranged for the control of speed by control of the flow of motive fluid to the associated prime mover, each of said speed regulators comprising a spring biased solenoid, a speed control winding on said solenoid, said regulating system including at least one tachometer generator driven by one of said alternators and connected to energize said speed control windings to maintain each of said solenoids in a pre-determined position corresponding to a desired operating speed, a load current measuring winding for each of said alternators, connections between said current measuring windings for establishing electrical signals indicative of the degree of deviation from a pre-determined desired ratio of generator loads, load adjusting windings on each of said solenoids and at least one load measuring circuit connected between said current measuring windings and said load adjusting solenoid windings for adjusting the individual speed regulators to maintain said pre-determined desired generator load ratio.

9. A regulating system for a plurality of parallel connected alternators respectively driven by separate prime movers for maintaining load frequency, system stability, and desired load distribution among the various alternators, said regulator comprising a speed signal generating tachometer driven by each prime mover, a speed control winding connected to be energized by said tachometer, a spring biased solenoid arranged for positioning by the energization of said speed control winding, a hydraulic servo control valve connected to said solenoid for positioning thereby, a hydraulic power piston hydraulically connected for positioning in accordance with the position of said servo control valve, a motive fluid control valve for said prime mover connected to said power piston for positioning thereby, a wattmeter circuit connected to each alternator for measuring the electrical load thereon in terms of at least one voltage and one current and including a current measuring winding, a load adjustment winding on each of said solenoids, connections from each of said wattmeter circuits to the associated load adjustment winding for energization thereof, and parallel connections between each of said current measuring windings and all of the other current measuring windings for comparing the respective generator loads and determining deviations from a desired load ratio whereby said wattmeter circuits simultaneously energize said load adjustment windings with proper polarities to adjust the respective prime movers to maintain the desired alternator load ratio.

ERNEST E. LEWIS.
RAYMOND E. THORN.

REFERENCES CITED

The following references are of record in the file of this patent:

UNITED STATES PATENTS

| Number | Name | Date |
|---|---|---|
| 1,095,178 | Warren | Apr. 28, 1914 |
| 1,718,454 | Conwell | June 25, 1929 |
| 1,762,672 | Spennemann | June 10, 1930 |
| 1,863,302 | Geiselman | June 14, 1932 |
| 1,984,940 | Plechl | Dec. 18, 1934 |
| 2,008,506 | Kieser | July 16, 1935 |
| 2,366,968 | Kaufmann | Jan. 9, 1945 |
| 2,501,340 | Kresser | Mar. 21, 1950 |
| 2,504,768 | Watson et al. | Apr. 18, 1950 |